US012334740B2

(12) United States Patent
 Suzuki

(10) Patent No.: US 12,334,740 B2
(45) Date of Patent: Jun. 17, 2025

(54) POWER DISTRIBUTION APPARATUS, POWER DISTRIBUTION METHOD, AND COMPUTER-READABLE MEDIUM

(71) Applicant: FUJI ELECTRIC CO., LTD., Kawasaki (JP)

(72) Inventor: Ryohei Suzuki, Hachiouji (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 676 days.

(21) Appl. No.: 17/452,070

(22) Filed: Oct. 25, 2021

(65) Prior Publication Data

US 2022/0149631 A1 May 12, 2022

(30) Foreign Application Priority Data

Nov. 11, 2020 (JP) ................................. 2020-188343

(51) Int. Cl.
 *H02J 3/38* (2006.01)
 *H02J 3/46* (2006.01)

(52) U.S. Cl.
 CPC .............. *H02J 3/381* (2013.01); *H02J 3/466* (2020.01); *H02J 2203/20* (2020.01); *H02J 2300/28* (2020.01)

(58) Field of Classification Search
 USPC ........................................................ 700/286
 See application file for complete search history.

(56) References Cited

U.S. PATENT DOCUMENTS

| 2015/0214741 | A1* | 7/2015 | Kuroda | H02J 3/24 |
| | | | | 700/298 |
| 2016/0259314 | A1* | 9/2016 | Dhople | H02M 7/44 |
| 2018/0351361 | A1 | 12/2018 | Miyake | |
| 2020/0373759 | A1* | 11/2020 | Samaan | H02J 3/144 |

FOREIGN PATENT DOCUMENTS

| JP | 2013074668 A | * | 4/2013 |
| JP | 2017099091 A | | 6/2017 |
| JP | 2019221045 A | * | 12/2019 |

OTHER PUBLICATIONS

Reddy, "Power System Operation and Control" Vardhaman College of Engineering, Course Syllabus, 61 pgs., accessed on Oct. 25, 2024 at https://www.freebookcentre.net/electronics-ebooks-download/Power-System-Operation-and-Control.html (Year: 2024).*

(Continued)

*Primary Examiner* — Emilio J Saavedra

(57) ABSTRACT

A power distribution apparatus configured to calculate, for a plurality of distributed power supplies connected to an electric power system, active power and reactive power to be outputted from each of the distributed power supplies, comprising: output estimation unit for estimating, based on the past operation history of each of the distributed power supplies, the output range of the electrical power that can be outputted from each of the distributed power supplies in the future; and a calculating unit configured to calculate, based on the output range, the active power and the reactive power of each of the distributed power supplies, which can satisfy a predetermined objective condition and constraint condition.

13 Claims, 11 Drawing Sheets

(56) References Cited

OTHER PUBLICATIONS

Fiore, "AC Electrical Circuit Analysis A Practical Approach" Oct. 2024, 422 pgs., accessed on Oct. 25, 2024 at https://open.umn.edu/opentextbooks/textbooks/ac-electrical-circuit-analysis-a-practical-approach-fiore (Year: 2024).*

Office Action issued for counterpart Japanese Application No. 2020-188343, issued by the Japanese Patent Office on Feb. 2, 2021 (drafted on Jan. 29, 2021).

* cited by examiner

EXAMPLE OF $P_L=4$

EXAMPLE OF $P_L=6$

ANOTHER EXAMPLE OF $P_L=6$
(WHEN APPROPRIATE RANGE OF VOLTAGE IS NARROW)

POWER DISTRIBUTION APPARATUS, POWER DISTRIBUTION METHOD, AND COMPUTER-READABLE MEDIUM

The contents of the following Japanese patent application are incorporated herein by reference:
NO. 2020-188343 filed in JP on Nov. 11, 2020.

BACKGROUND

1. Technical Field

The present invention relates to a power distribution apparatus, a power distribution method, and a computer-readable medium.

A technology of predicting controllable amount of reactive power from both a predicted value of maximum power generated by a distributed power supply, and a rated capacity of an apparatus is known (for example, see Patent document 1). The technology of Patent document 1 determines whether a voltage can be stabilized only by reactive power being output from a distributed power supply, by performing a power flow calculation based on a controllable amount of reactive power which is predicted.

PRIOR ART DOCUMENT

Patent Document

Patent document 1: Japanese Patent Application Publication No. 2013-74668

In an electric power system, in a case where a distributed power supply is introduced, it is desirable to maintain electrical power and voltage while attempting to reduce power transmission loss.

SUMMARY

In the first aspect of the present invention, a power distribution apparatus is provided. The power distribution apparatus may calculate, for a plurality of distributed power supplies connected to an electric power system, active power and reactive power to be outputted from each of the distributed power supplies. The power distribution apparatus may include an output estimation unit and a calculating unit. The output estimation unit may estimate, based on a past operation history of each of the distributed power supplies, an output range of electrical power which can be outputted from each of the distributed power supplies in the future. The calculating unit may calculate, based on the output range, active power and reactive power of each of the distributed power supplies, which can satisfy a predetermined objective condition and constraint condition.

The calculating unit may calculate, based on at least two output states within the output range, active power and reactive power of each of the distributed power supplies, which can satisfy a predetermined objective condition and constraint condition.

Each of the distributed power supplies may be connected to the electric power system via respective inverters. The constraint condition may include a condition where a voltage at a connection point between the respective inverters and the electric power system is equal to or more than a predetermined lower limit value and equal to or less than a predetermined upper limit value.

The constraint condition may include electrical power to be outputted from each of the distributed power supplies in the future as an uncertain parameter that may vary within the output range. The calculating unit may calculate active power and reactive power of each of the distributed power supplies by solving a power flow equation such that the active power and the reactive power resulting from the calculation satisfy the constraint condition including the uncertain parameter.

The calculating unit may select a plurality of provisional values of the uncertain parameter within the output range. The calculating unit may calculate a solution of active power and a solution of reactive power of the distributed power supply which, even in the case where the uncertain parameter is set to any of the plurality of provisional values, can satisfy the constraint condition, and which maximize or minimize a value of objective function provided as the predetermined objective condition.

The objective condition may include a condition where a sum of power transmission loss in the electric power system and output suppression amount for electrical power of each of the distributed power supplies is minimized.

The output estimation unit may estimate the output range based on a standard deviation of an output change amount of the distributed power supply in a predetermined period.

The past operation history of the distributed power supply may include an actual value of output power of the distributed power supply and information indicating whether the output of the distributed power supply has been suppressed. In a period where the output of the distributed power supply has been suppressed, the output estimation unit may estimate the output range using an estimated actual value calculated from a predetermined relational equation instead of the actual value of the output power.

In the second aspect of the present invention, provided is a computer-readable medium having a program recorded thereon, wherein the program causes, when being executed by a computer, the computer to function as the power distribution apparatus described above.

In the third aspect of the invention, a power distribution method is provided. The power distribution method may calculate, by using a computer, for a plurality of distributed power supplies connected to an electric power system, active power and reactive power to be outputted. The power distribution method may include an output estimation step and a calculating step. The output estimation step may estimate, based on a past operation history of each of the distributed power supplies, an output range of electrical power which can be outputted from each of the distributed power supplies in the future. The calculating step may calculate, based on the output range, active power and reactive power of each of the distributed power supplies, which can satisfy a predetermined objective condition and constraint condition.

Note that the above-mentioned summary does not necessarily describe all necessary features of the embodiments of the present invention. The present invention may also be a sub-combination of the features described above.

DESCRIPTION OF EXEMPLARY EMBODIMENTS

Hereinafter, the present invention will be described through embodiments of the invention. However, the following embodiments do not limit the claimed invention. In addition, not all combinations of features described in the embodiments are essential to the solution of the invention.

Figure 1:
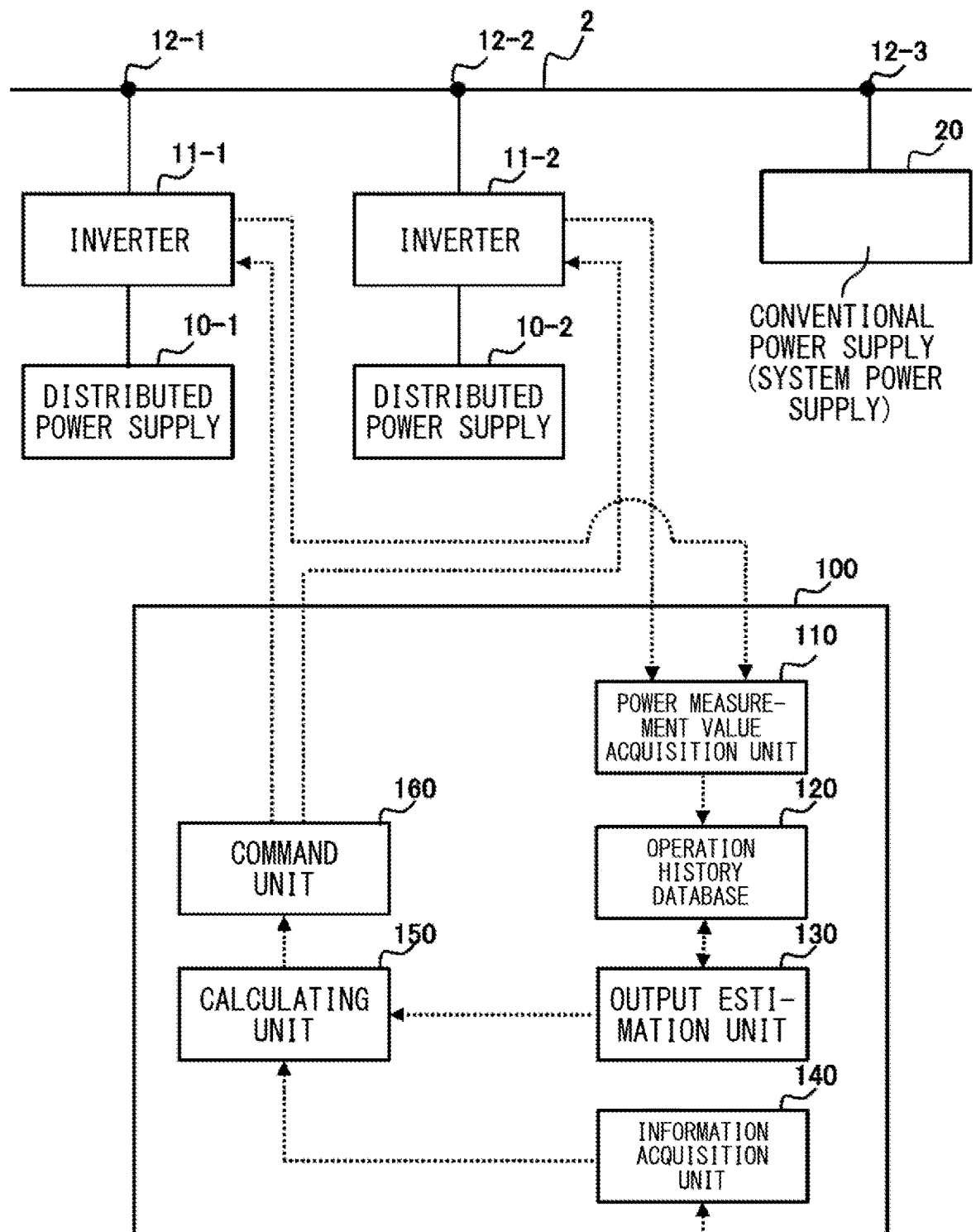
FIG. 1 shows one example of the configuration of power distribution apparatus in one embodiment of the present invention.

FIG. 1 shows one example of the configuration of power distribution apparatus in one embodiment of the present invention. In one example, the power distribution apparatus 100 calculates, for a plurality of distributed power supplies 10-1 and 10-2 connected to the electric power system 2, active power and reactive power to be outputted from the respective distributed power supplies 10-1 and 10-2. The distributed power supply 10-1 is connected to the electric power system 2 at an interconnection point 12-1 via an inverter 11-1. The distributed power supply 10-2 is connected to the electric power system 2 at an interconnection point 12-2 via an inverter 11-2. Note that a conventional power supply 20 (system power supply) may be connected to the electric power system 2 at an interconnection point 12-3.

The electric power system 2 may be a power transmission system or may be a power distribution system. The distributed power supplies 10-1 and 10-2 (sometimes collectively referred to as distributed power supply 10) may be a renewable energy such as a wind power generator and a solar power generator, or may be a fuel battery or a storage battery. In the present example, the distributed power supply 10 is a solar power generator.

The inverters 11-1 and 11-2 (sometimes collectively referred to as inverter 11) is a power conversion unit which converts electrical power from the distributed power supply 10 to output the electrical power between themselves and the electric power system 2. The inverters 11-1 and 11-2 are also referred to as PCS (Power Conditioning System).

The power distribution apparatus 100 includes a power measurement value acquisition unit 110, an operation history database 120, an output estimation unit 130, an information acquisition unit 140, a calculating unit 150, and a command unit 160. The power measurement value acquisition unit 110 acquires a measurement value of output power (generated power) generated by the distributed power supplies 10-1 and 10-2. The output power may be measured by a current transformer (CT) and an instrument transformer (VT). An actual value of each output power of the distributed power supplies 10-1 and 10-2 obtained by the power measurement value acquisition unit 110 is chronologically stored, as an operation history, in the operation history database 120. The operation history may include the actual value of each output power of the distributed power supplies 10-1 and 10-2, and information indicating whether the output of the distributed power supplies 10-1 and 10-2 has been suppressed.

The output estimation unit 130 estimates, based on a past operation history of the respective distributed power supplies 10-1 and 10-2, an output range of electrical power which can be outputted from the respective distributed power supplies 10-1 and 10-2 in the future. The information acquisition unit 140 acquires various kinds of information that the calculating unit 150 requires for calculation. To be specific, the information acquisition unit 140 may acquire system information, information about the distributed power supply 10, and information about operational condition.

The calculating unit 150 calculates, based on the output range, active power P and reactive power Q to be outputted from the respective distributed power supplies 10-1 and 10-2, which can satisfy a predetermined objective condition and constraint condition. The command unit 160 commands, to the distributed power supplies 10-1 and 10-2, active power $P_D$ and reactive power $Q_D$ to be outputted from the respective distributed power supplies 10-1 and 10-2.

Unlike the technology in the Japanese Patent Application Publication No. 2013-74668 or the like, in the power distribution apparatus 100 of the present embodiment, a predetermined constraint condition includes an uncertain parameter which may vary within the output range. The uncertain parameter may be active power $P_{DU}$ to be outputted by each of the distributed power supplies 10-1 and 10-2 in the future. Active power $P_{DU}$ is active power in the case where output suppression (output limitation) is not applied. The calculating unit 150 calculates active power $P_D$ and reactive power $Q_D$ of the respective distributed power supplies 10-1 and 10-2 by solving a power flow equation such that the solution satisfy the constraint condition including the uncertain parameter. The technology in the Japanese Patent Application Publication No. 2013-74668 or the like outputs the predicted maximum output power (generated power) to the outside to the limit of the rated capacity of the inverter, and do not consider power transmission loss of the electric power system 2, and the increase or the like in the output suppression opportunity of the distributed power supplies 10-1 and 10-2.

In general, reactive power supply from the distributed power supplies 10-1 and 10-2 has an effect of decreasing voltage at the interconnection point. However, in the reactive power supply, the increase of voltage variation, the increase of power transmission loss, and the increase of the output suppression amount may occur, which affects economic efficiency and electrical power quality. The power distribution apparatus 100 according to an embodiment of the present invention realizes power distribution that can minimize the power transmission loss and the output suppression amount or the like after considering all of the constraint condition where the voltage falls within an appropriate range or the like.

The power distribution apparatus 100 according to an embodiment of the present invention jointly uses a technology of output distribution estimation of the distributed power supplies 10-1 and 10-2, and the optimum flow calculation based on a robust optimization. The robust optimization means a modeling technique and its solution of the optimization problem which returns a reliable result even if when the data defining the problem is inaccurate or uncertain. Assuming that there is a gathering in which data defining the problem exists, the robust optimization is formulated in the form of optimization in the worst case in the gathering. To be specific, the calculating unit 150 calculates a solution in which voltage at an interconnection point always falls within the appropriate range of voltage or the like, even if any output included in the obtained output distribution has been supplied from the distributed power supplies 10-1 and 10-2.

Figure 2:
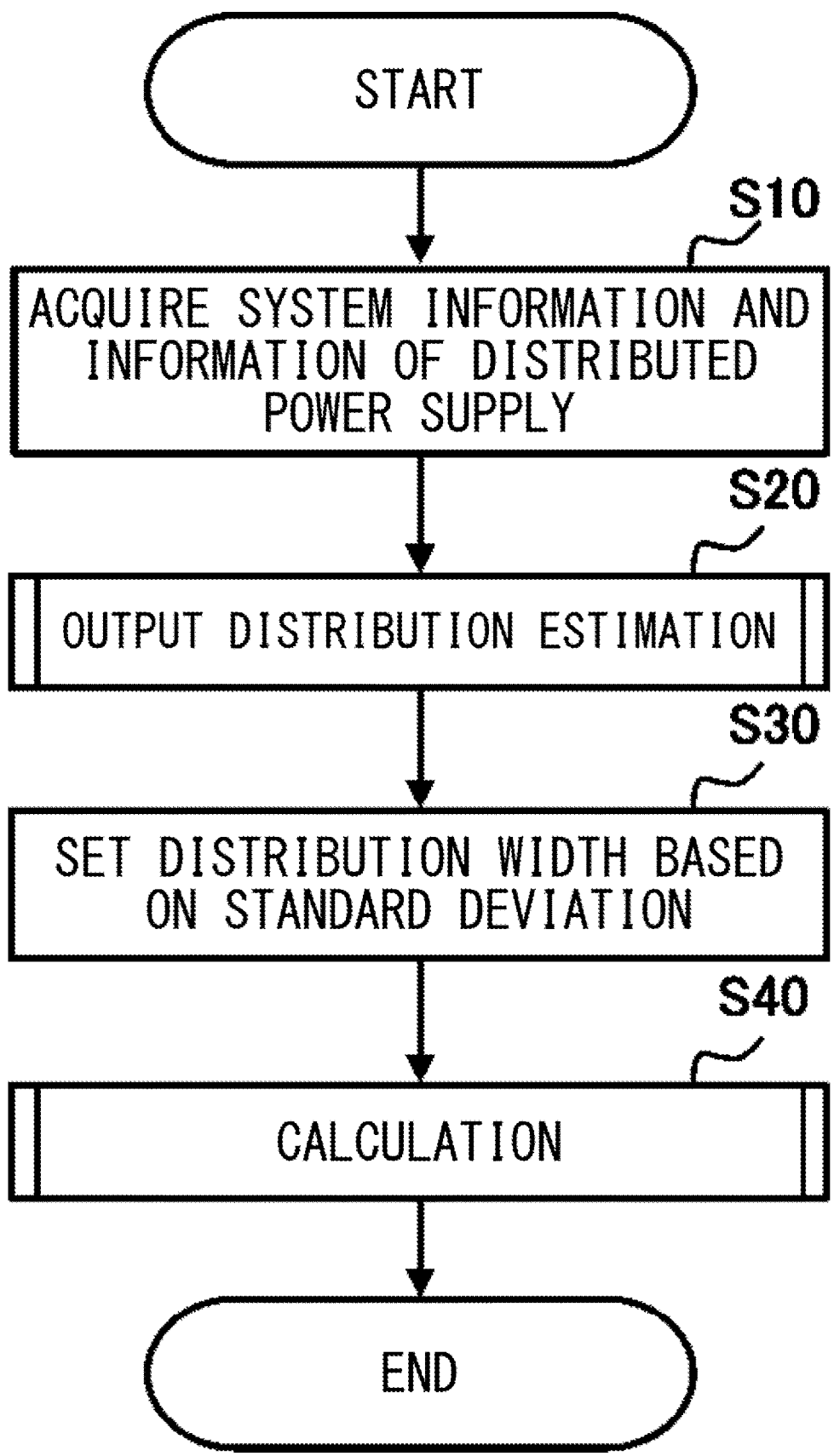
FIG. 2 is a flowchart indicating one example of the power distribution method according to the power distribution apparatus.

FIG. 2 is a flowchart indicating one example of the power distribution method according to the power distribution apparatus 100. The power distribution method indicated in FIG. 2 calculates, by using a computer, active power and reactive power to be outputted from a plurality of distributed power supplies 10-1 and 10-2 connected to the electric power system 2.

The information acquisition unit 140 acquires system information and information of the distributed power supply 10 (step S10). An information acquisition unit 140 acquires system information of all nodes of the electric power system 2 being an evaluation target. The system information may include a configuration of the system, information of each power generator, and information of active power and reactive power in the load. The information acquisition unit 140 acquires information for operation. In the information for operation, information about the appropriate range of voltage may be included. The information acquisition unit 140 may acquire information of output rating or the like as information of the distributed power supply 10. The information acquisition unit 140 may acquire various kinds of information by online or may acquire various kinds of information by offline.

The output estimation unit 130 estimates output distribution of the distributed power supplies 10-1 and 10-2 (step S20). The output estimation unit 130 extracts output change amount during any time section (for example, 10 seconds) from an actual value (a past history) of active power output in the past interval T of the distributed power supplies 10-1 and 10-2. Then, the output estimation unit 130 calculates a standard deviation σ of the output change amount. The calculated standard deviation σ may be stored in the operation history database 120.

The output estimation unit 130 sets the output distribution width (step S30). The output estimation unit 130 estimates, in the future after any time period (for example, after 10 seconds) from the present value, the output range of electrical power that can be outputted from the distributed power supplies 10-1 and 10-2. The output estimation unit 130 multiplies the above-mentioned standard deviation σ by any constant and adds the multiplication result to a moving average value of the present time. That is, the output estimation unit 130 may calculate the output range by using the following equation: output range (output distribution width) after a predetermined period=moving average value from interval T up to the present±(constant)×a standard deviation of output change amount (difference value). In a case where confidence interval is to be 95%, the constant is set to 2. In a case where confidence interval is to be 99%, the constant is set to 3. As described above, the output estimation unit 130 estimates the output range based on standard deviations of output change amounts of the distributed power supplies 10-1 and 10-2 in a predetermined period.

The calculating unit 150 performs calculation including optimum flow calculation (step S40). The calculating unit 150 calculates, based on the output range, active power and reactive power of the respective distributed power supplies 10-1 and 10-2, which can satisfy a predetermined objective condition and constraint condition. In a case where the output range (output distribution width) is obtained by the output estimation unit 130, the calculating unit 150 performs optimum flow calculation based on the robust optimization in order to calculate the solution which certainly satisfies the constraint condition when there is any output within the output range.

The processes in the step S20 and step S30 in FIG. 2 correspond to, based on the past operation history of the respective distributed power supplies 10-1 and 10-2, an output estimation step for estimating the output range of the electrical power that can be outputted from the respective distributed power supplies 10-1 and 10-2 in the future. The process in the step S40 corresponds to a calculating step for calculating, based on the output range, active power and reactive power of the respective distributed power supplies 10-1 and 10-2, which can satisfy a predetermined objective condition and constraint condition.

Figure 3:
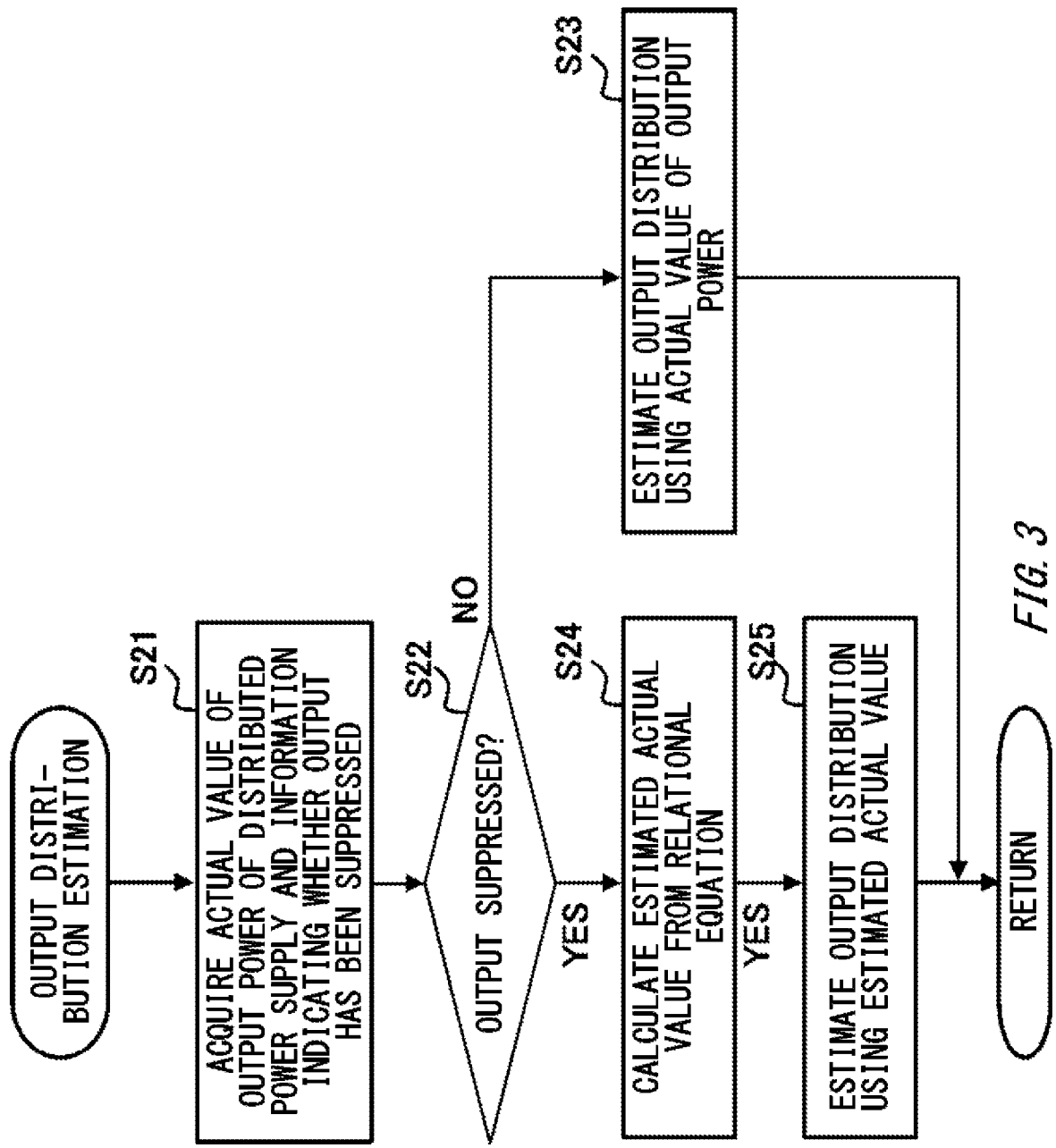
FIG. 3 is a flowchart indicating one example of an output distribution estimation process.

FIG. 3 is a flowchart indicating one example of output distribution estimation process. FIG. 3 may be a subroutine of the step S20 in FIG. 2. The output estimation unit 130 acquires the past operation history of the distributed power supply 10 (step S21). The past operation history may include an actual value of output power of the distributed power supply 10 and information indicating whether the output of the distributed power supply 10 has been suppressed.

In a period where the distributed power supply 10 has not experienced output suppression (step S22: NO), the output estimation unit 130 estimates the output distribution using the actual value of the output power (step S23). On the other hand, in a period where the distributed power supply 10 has experienced the output suppression, the practical actual output value may not be obtained. Accordingly, in a period where the distributed power supply 10 has experienced the output suppression (step S22: YES), the output estimation unit 130 calculates an estimated actual value from a relational equation (step S24). Then, the output estimation unit 130 estimates the output distribution using the estimated actual value calculated by the relational equation (step S25). In order to complement, by estimation, the actual output value for the period where the output suppression is applied, the relational equation may be an estimation model which is created in advance from the history of the actual output value in the case where there is no past insolation and output suppression. The estimation model may use insolation as a variable, or may use a temperature or another weather condition other than insolation as a variable.

Figure 4:
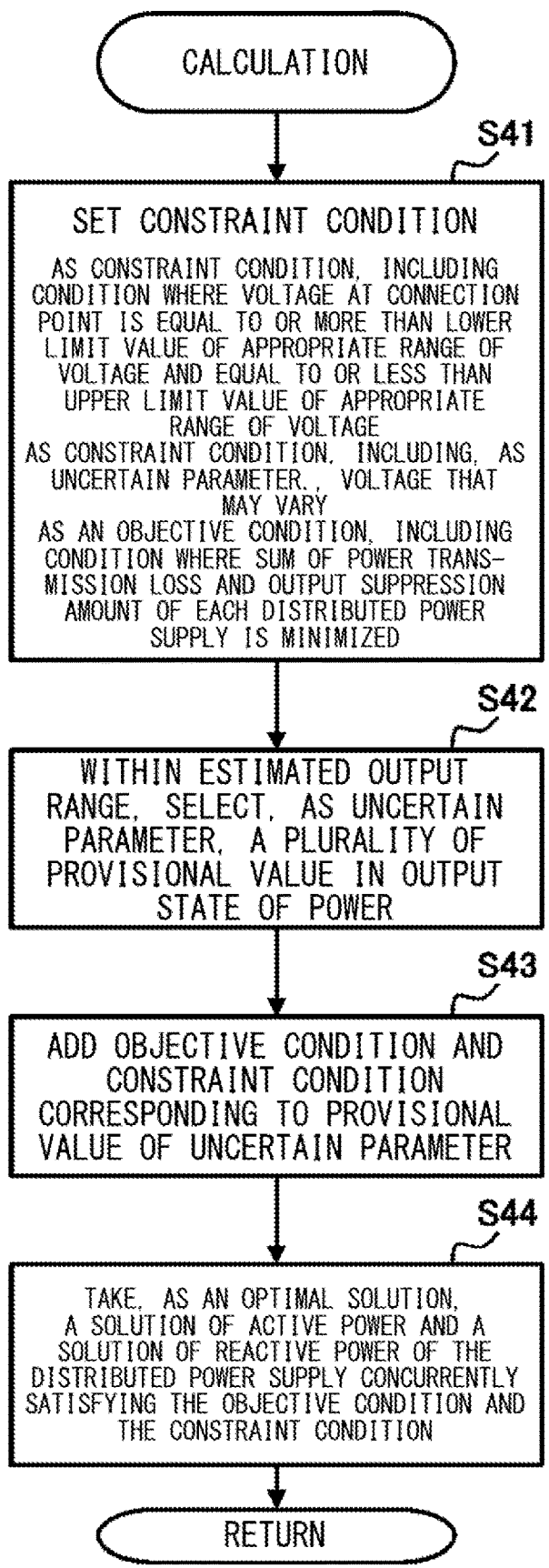
FIG. 4 is a flowchart indicating one example of a calculating process.

FIG. 4 is a flowchart indicating one example of calculating process. FIG. 4 may be a subroutine of the step S40 from FIG. 2. A constraint condition may be set in advance (step S41). The calculating unit 150 calculates, as a solution, active power $P_D$ and reactive power $Q_D$ of the respective distributed power supplies 10-1 and 10-2, which can satisfy a predetermined objective condition and constraint condition. In particular, the constraint condition may include an uncertain parameter that may vary within the output range. The uncertain parameter may be active power $P_D$ before suppression, which can be outputted by each of the distributed power supplies 10-1 and 10-2 in the future. The calculating unit 150 may calculate active power and reactive power of the respective distributed power supplies 10-1 and 10-2 by solving a power flow equation such that the solution satisfy the constraint condition including the uncertain parameter.

The objective condition may include a condition where a sum of power transmission loss in the electric power system 2 and output suppression amount for electrical power of the respective distributed power supplies 10-1 and 10-2 is minimized.

The calculating unit 150 may calculate, based on at least two output states within the output range, active power and reactive power of each of the distributed power supplies, which can satisfy a predetermined objective condition and constraint condition. This is different from the technology in the Japanese Patent Application Publication No. 2013-74668 or the like which performs calculation based on the maximum value within the expected output range only. To be specific, in one example, the calculating unit 150 selects a plurality of provisional values of the uncertain parameter within the output range (step S42). The calculating unit 150 adds an objective condition and a constraint condition corresponding to the provisional value of the uncertain parameter (step S43).

The calculating unit 150 takes, as an optimal solution, a solution of active power and a solution of reactive power of the distributed power supplies 10-1 and 10-2 concurrently satisfying the objective condition and the constraint condition respectively corresponding to each provisional value (step S44).

Figure 5:
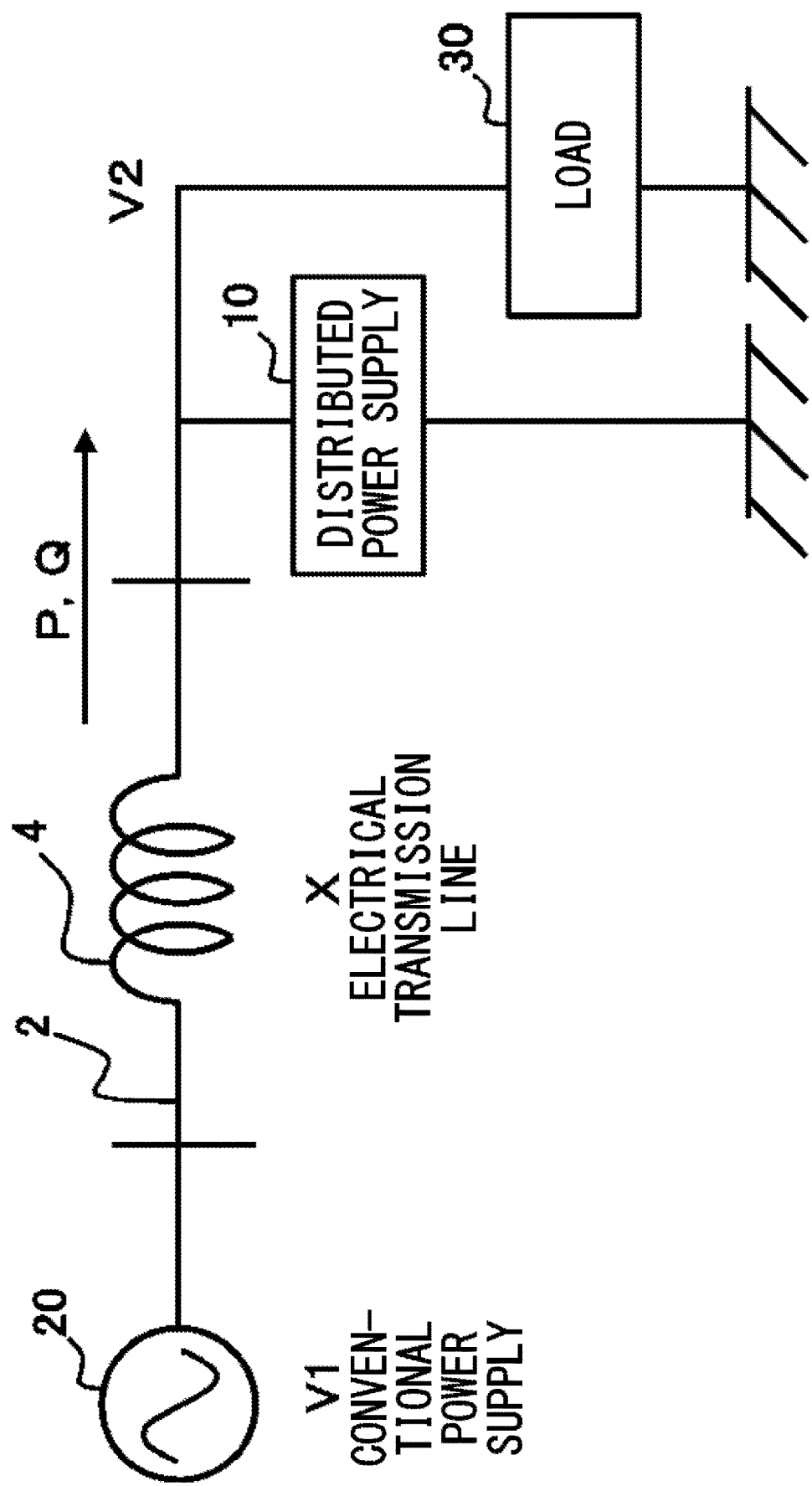
FIG. 5 is one example of the configuration example having a simple system.

Hereinafter, contents of the calculating process will be described with reference to configuration examples including a simple system. FIG. 5 is one example of the configuration example having a simple system. In a configuration example indicated in FIG. 5, the conventional power supply 20 is connected to the distributed power supply 10 and the load 30 via the electrical transmission line 4. That is, one load 30 is connected to one conventional power supply 20, and one distributed power supply 10 is connected to the load node. In this electric power system 2, the optimization problem is formulated as follows.

$$\text{Objective condition min } P + we \tag{1a}$$

$$\text{Constraint condition } P = (V_1 V_2) \sin \delta / X \tag{1b}$$

$$Q = (V_1 V_2) \cos \delta / X - V_2^2 / X \tag{1c}$$

$$P = P_L - P_D \tag{1d}$$

$$V_{2min} \leq V_2 \leq V_{2max} \tag{1e}$$

$$P_{DUmin} \leq P_{DU} \leq P_{DUmax} \tag{1f}$$

$$P_{Dmin} \leq P_D \leq P_{Dmax} \tag{1g}$$

$$Q_{Dmin} \leq Q_D \leq Q_{Dmax} \tag{1h}$$

$$0 \leq e \tag{1i}$$

$$P_{DU} - P_D \leq e \tag{1j}$$

$$P_D^2 + Q_D^2 \leq S_D^2 \tag{1k}$$

Herein, w is a penalty coefficient and is a large positive real number. A voltage at node 1 where the conventional power supply 20 is located is set to $V_1$, and a voltage at node 2 to which the load 30 and the distributed power supply 10 are connected is set to $V_2$. Also, at the node 2, active power is set to P, reactive power is set to Q, and voltage phase is set to $\delta$. In addition, a load is set to $P_L$. Equation (1b) and equation (1c) is a power flow equation in the case where the impedance of the electrical transmission line is set to X. Also, active power without output suppression (output limitation) of the distributed power supply 10 is set to $P_{DU}$, active power with output suppression is set to $P_D$, and the output suppression amount (output control amount) is set to e. Note that $P_{DU}$ is an uncertain parameter, and can be predicted to be fall within a predetermined range (equation 1f).

Figure 6:
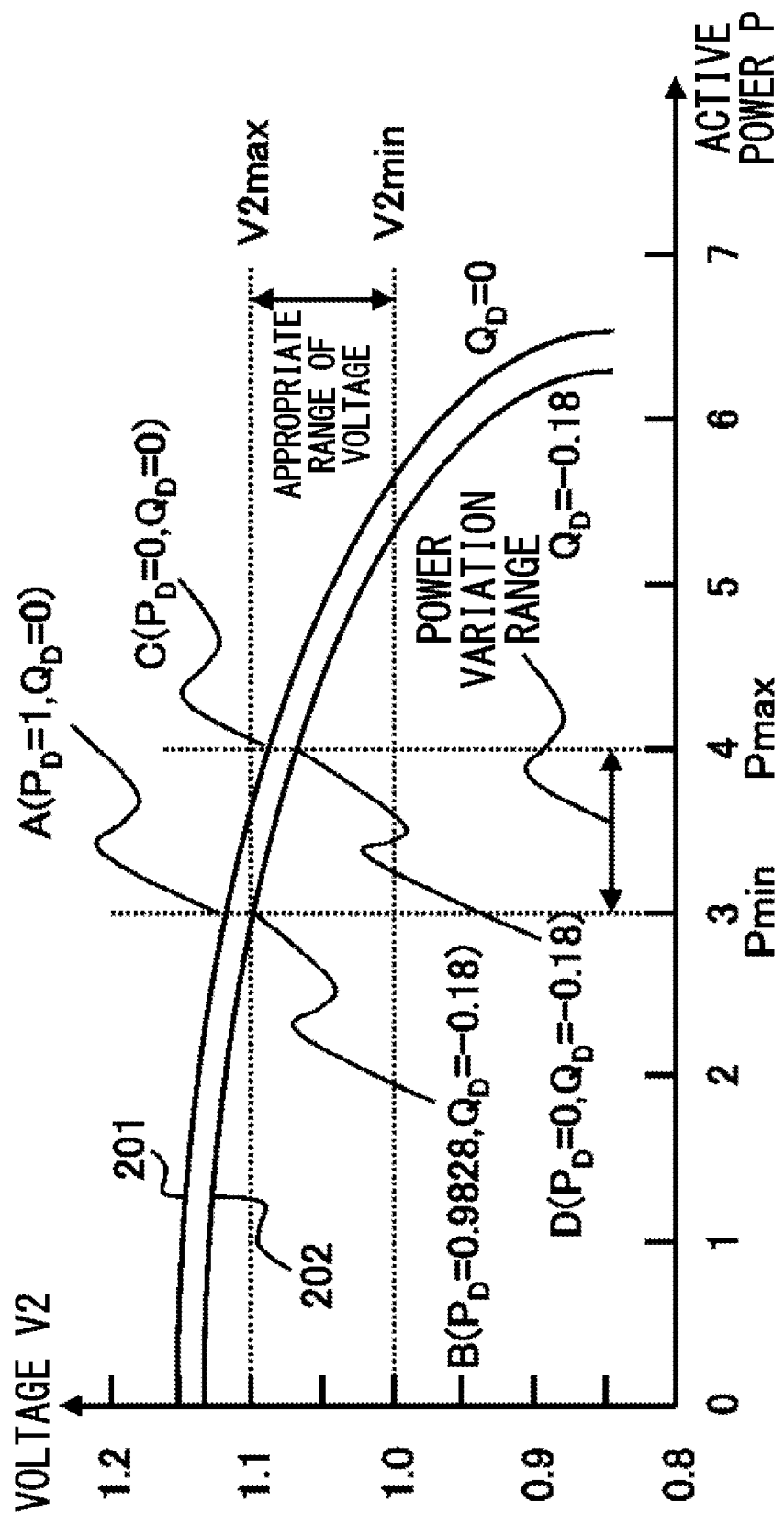
FIG. 6 shows one example of a solution in the simple system.

FIG. 6 shows one example of a solution in the simple system indicated in FIG. 5. In FIG. 6, a horizontal axis indicates active power P in the node 2, and a vertical axis indicates voltage $V_2$ in the node 2. PV curves 201, 202 in FIG. 6 indicates relationship between P and $V_2$ in the case where $P_L=4$. A, B, C and D represent solutions. In FIG. 6, a PV curve 201 in the case where reactive power $Q_D$ of the distributed power supply 10=0 and a PV curve 202 in the case where reactive power $Q_D$ of the distributed power supply 10=–0.18 are shown as the PV curves. The example shown in FIG. 6 is a case deviating from voltage upper limit ($V_2 \leq 1.1$ p.u) depending on a value of active power $P_{DU}$ of the distributed power supply 10 when there is no output limitation. As the robust solution, it is required to satisfy voltage constraint ($1 \leq V_2 \leq 1.1$ p.u) through the uncertain output range $0 \leq P_{DU} \leq 1$ of the distributed power supply 10. Note that since $P=P_L-P_D$, $P_{DU}-P_D \leq e$, $0 \leq e$, and $P_L=4$, an output range $0 \leq P_{DU} \leq 1$ corresponds to $3 \leq P \leq 4$. As a method of satisfying the voltage constraint, there are a method of applying an output limitation to active power $P_{DU}$, and a method of decreasing the voltage by supplying reactive power $Q_D$ to the electric power system 2. According to the objective function (1a), it is preferable that the output limitation amount e is as small as possible. However, an output of the reactive power $Q_D$ is limited by the capacity constraint (equation 1k). Accordingly, a solution being applied only with output limitation in which the reactive power $Q_D$ can be slightly output, that is, a case in which $P_D=0.9828$, $Q_D=-0.18$ like B in FIG. 6 assuming the worst value as $P_{DU}=1(P=3)$, is calculated as a robust solution.

As shown in FIG. 6, the calculating unit 150 may calculate active power $P_D$ and reactive power $Q_D$ of the distributed power supply 10, based on at least two output states of the output range of $P_{DU}$ ($0 \leq P_{DU} \leq 1$), that is, a case where $P_{DU}=1$ and a case where $P_{DU}=0$.

Figure 7:
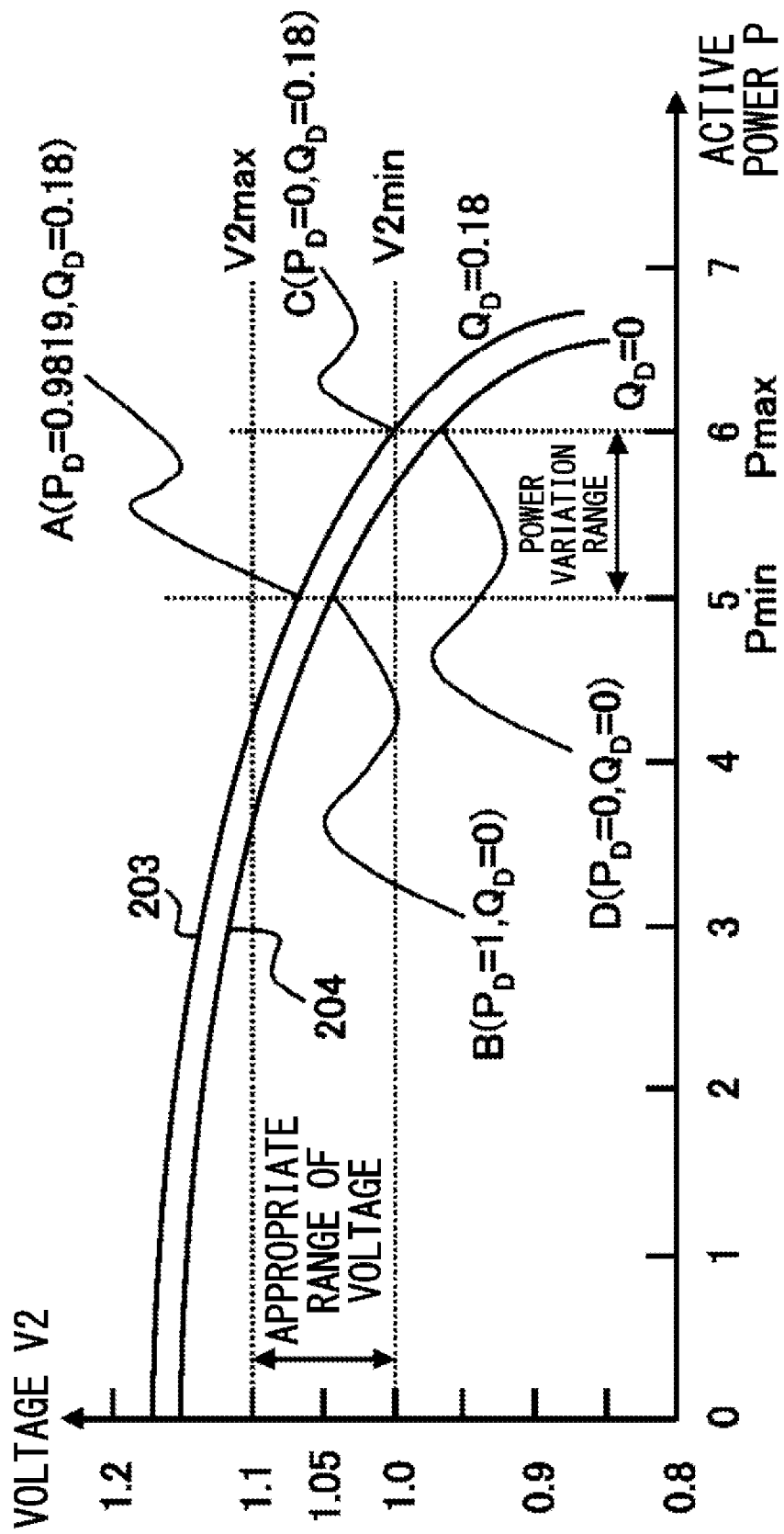
FIG. 7 shows another example of the solution of the simple system.

FIG. 7 shows another example of the solution of the simple system. In FIG. 7, the horizontal axis indicates active power P in the node 2, and the vertical axis indicates voltage $V_2$ in the node 2. PV curves 203, 204 in FIG. 7 indicates relationship between P and $V_2$ in the case where $P_L=6$. A, B, C and D represent solutions. In FIG. 7, the PV curve 203 in the case where reactive power $Q_D$ of the distributed power supply 10=0.18 and the PV curve 204 in the case where reactive power $Q_D$ of the distributed power supply 10=0 are shown as the PV curves. The example shown in FIG. 7 is a case deviating from voltage lower limit ($1 \leq V_2$) depending on a value of active power $P_{DU}$ of the distributed power supply 10 when there is no output limitation. As the robust solution, it is required to satisfy voltage constraint ($1 \leq V_2 \leq 1.1$ p.u) through the entire uncertain output range $0 \leq P_{DU} \leq 1$ of the distributed power supply 10. Note that since $P=P_L-P_D$, $P_{DU}-P_D \leq e$, $0 \leq e$, $P_L=6$, output range $0 \leq P_{DU} \leq 1$ corresponds to $5 \leq P \leq 6$. In the example shown in FIG. 7, $P_D=0.9819$, $Q_D=0.18$ is calculated as a robust solution, satisfying a voltage constraint that, as shown in A of FIG. 7, the output suppression amount e is minimal and the voltage is within the appropriate range of voltage.

Figure 8:
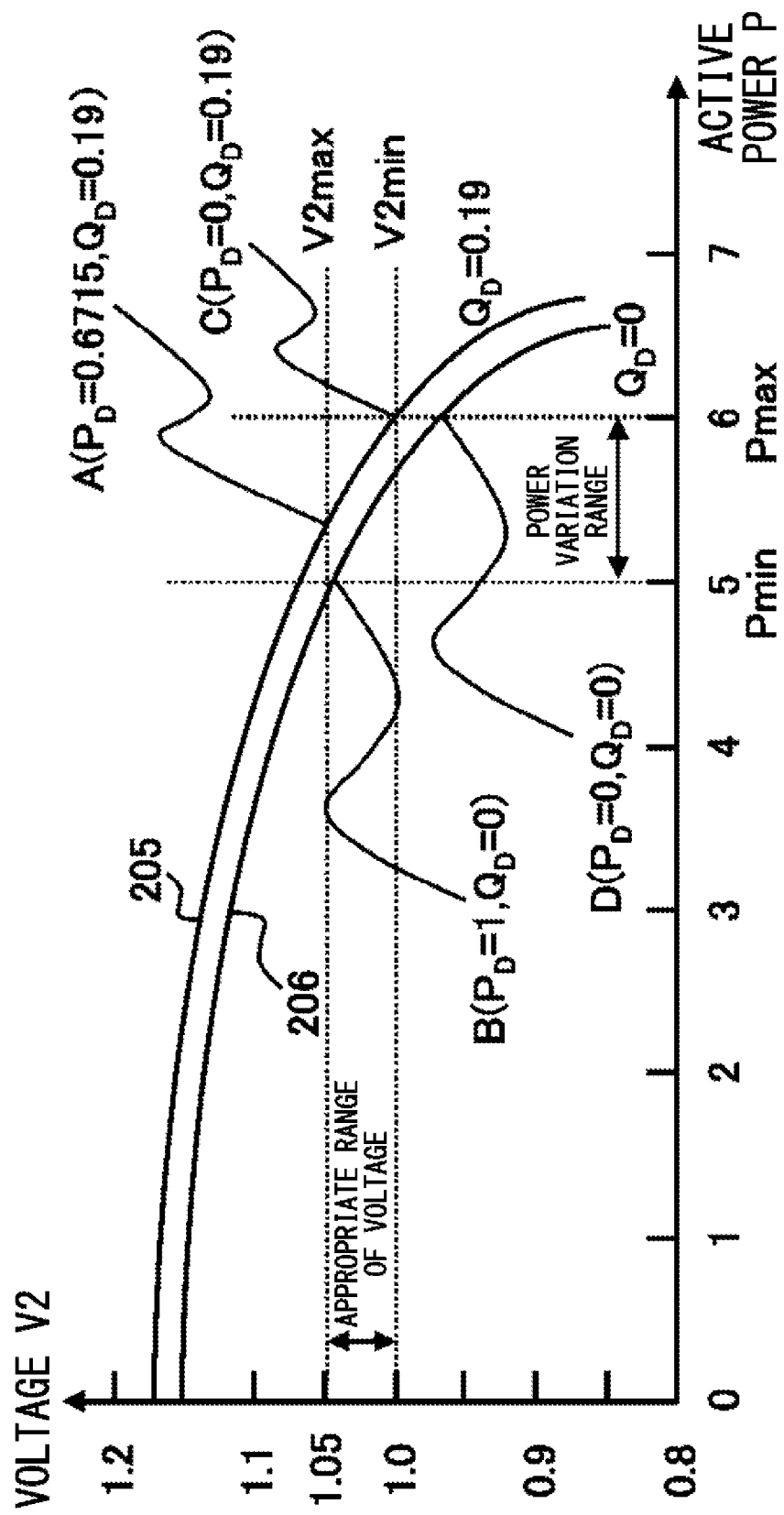
FIG. 8 shows another example of the solution of the simple system.

FIG. 8 shows another example of the solution of the simple system. In FIG. 8, the horizontal axis indicates active power P in the node 2, and the vertical axis indicates voltage $V_2$ in the node 2. PV curves 205, 206 in FIG. 8 indicates relationship between P and $V_2$ in the case where $P_L=6$. A, B, C and D represent solutions. In FIG. 8, the PV curve 205 in the case where reactive power $Q_D$ of the distributed power supply 10=0.19 and the PV curve 206 in the case where reactive power $Q_D$ of the distributed power supply 10=0 are shown as the PV curves. FIG. 8 is a case where the voltage constraint (appropriate range of voltage) is narrowed to be half ($1 \leq V_2 \leq 1.05$ p.u) of the case of FIG. 7 ($1 \leq V_2 \leq 1.1$ p.u). In the case shown in FIG. 8, the voltage may deviate from either of the voltage upper limit or voltage lower limit, or may concurrently deviate from both. To satisfy the voltage constraint, supplying reactive power to the electric power system 2, which causes voltage increase after imposing the output limitation, can be considered. In the example shown in FIG. 8, as shown in A of FIG. 8, a solution with $P_D$=0.6715, $Q_D$=0.19 is calculated as the robust solution.

As shown in FIG. 7 and FIG. 8, according to the power distribution apparatus 100 of the present embodiment, the constraint condition may include a condition where a voltage $V_2$ at a connection point between the respective inverters and the electric power system is equal to or more than a predetermined lower limit value and equal to or less than a predetermined upper limit value. In this way, it is possible to control the voltage so that it does not deviate from the voltage upper limit, and also it is possible to control the voltage so that it does not deviate from the voltage lower limit. In addition, it is possible to control the voltage so that it does not deviate from the voltage upper limit and the voltage lower limit.

Even in the case where a plurality of distributed power supplies 10 exist and the electric power system is more complicated, the calculating unit 150 may select a plurality of provisional values of $P_{DU}$ which is an uncertain parameter within the output range, and calculate, even in the case where the uncertain parameter $P_{DU}$ is set to any provisional value, a solution of active power $P_D$ and a solution of reactive power $Q_D$ of the distributed power supply 10 which can satisfy the predetermined objective condition and constraint condition. The calculating unit 150 selects a plurality of provisional values of the uncertain parameter within the output range, and may calculate a solution of the active power and a solution of the reactive power of the distributed power supply which, even in the case where the uncertain parameter is set to any of the plurality of provisional values, can satisfy the constraint condition, and which minimize a maximum value of an objective function provided as the objective condition, wherein the maximum value is a value at which the value of the objective function is maximized according to a provisional value selected from a plurality of provisional values. Unlike the present example, depending on content of the objective function, the calculating unit 150 may calculate a solution of active power and a solution of reactive power of the distributed power supply which maximize a value of the objective function.

Hereinafter, an operation optimization problem of a plurality of distributed power supplies 10 will be described. If the uncertain parameter of the distributed power supply is set to y, the decision variable (active power command value, reactive power command value or the like of the distributed power supply) is set to u, and the state variable (voltage magnitude, voltage phase, active power, reactive power or the like) is set to x, a power flow equation of the electric power system can be represented as below.

$$H(u,x,y)=0 \quad (2)$$

Also, constraint of voltage, power generator or the like generally can be represented as below.

$$G(u,x,y) \leq 0 \quad (3)$$

Similarly, the objective function generally can be represented as below.

$$\min f(u,x,y) \quad (4)$$

Then, the optimization problem to be solved can be formulated as an extremely general robust optimization problem as below.

Objective condition $\min f(u,x,y)$ (5a)

Constraint condition $G(u,x,y)=0$ (5b)

$H(u,x,y)=0$ (5c)

$u \in U, x \in X, y \in Y$

Here, since the state variable x is affected by the uncertain parameter y, a min-max problem is caused and it is rewritten as follows.

Objective condition $\min \max f(u,x,y)$ (6a)

Constraint condition $G(u,x,y) \leq 0$ (6b)

$H(u,x,y)=0$ (6c)

$u \in U, x \in X, y \in Y$

Here, with a new scalar variable σ introduced, it is further rewritten as follows. The scalar variable σ means a maximum value off.

Objective condition $\min \sigma$ (7a)

Constraint condition $f(u,x,y)-\sigma \leq 0$ (7b)

$G(u,x,y) \leq 0$ (7c)

$H(u,x,y)=0$ (7d)

$u \in U, x \in X, y \in Y$

If an infinite number of $y \in Y$ of the problem (7) is relaxed to a limited number (P) of $y^P$, it becomes an relax problem as below.

Objective condition $\min \sigma$ (8a)

Constraint condition $f(u,x^P,y^P)-\sigma \leq 0$ (8b)

$G(u,x^P,y^P) \leq 0$ (8c)

$H(u,x^P,y^P)=0$ (8d)

$u \in U, x^P \in X, y^P \in Y$

This can be solved by a typical nonlinear programming method.

In practice, implemented to the power distribution apparatus 100 may be the equation 8b as an objective function, and the equation 8d as a power flow equation. In this way, in an actual electric power system 2 including a plurality of distributed power supplies 10, the power distribution apparatus 100 of the present embodiment can also be applied. Note that as long as the power distribution apparatus 100 calculates a solution by jointly using the output distribution estimation of the distributed power supply 10 and the optimum flow calculation based on the robust optimization. It is not limited to the case described using the equation 1 to the equation 8.

Figure 9:
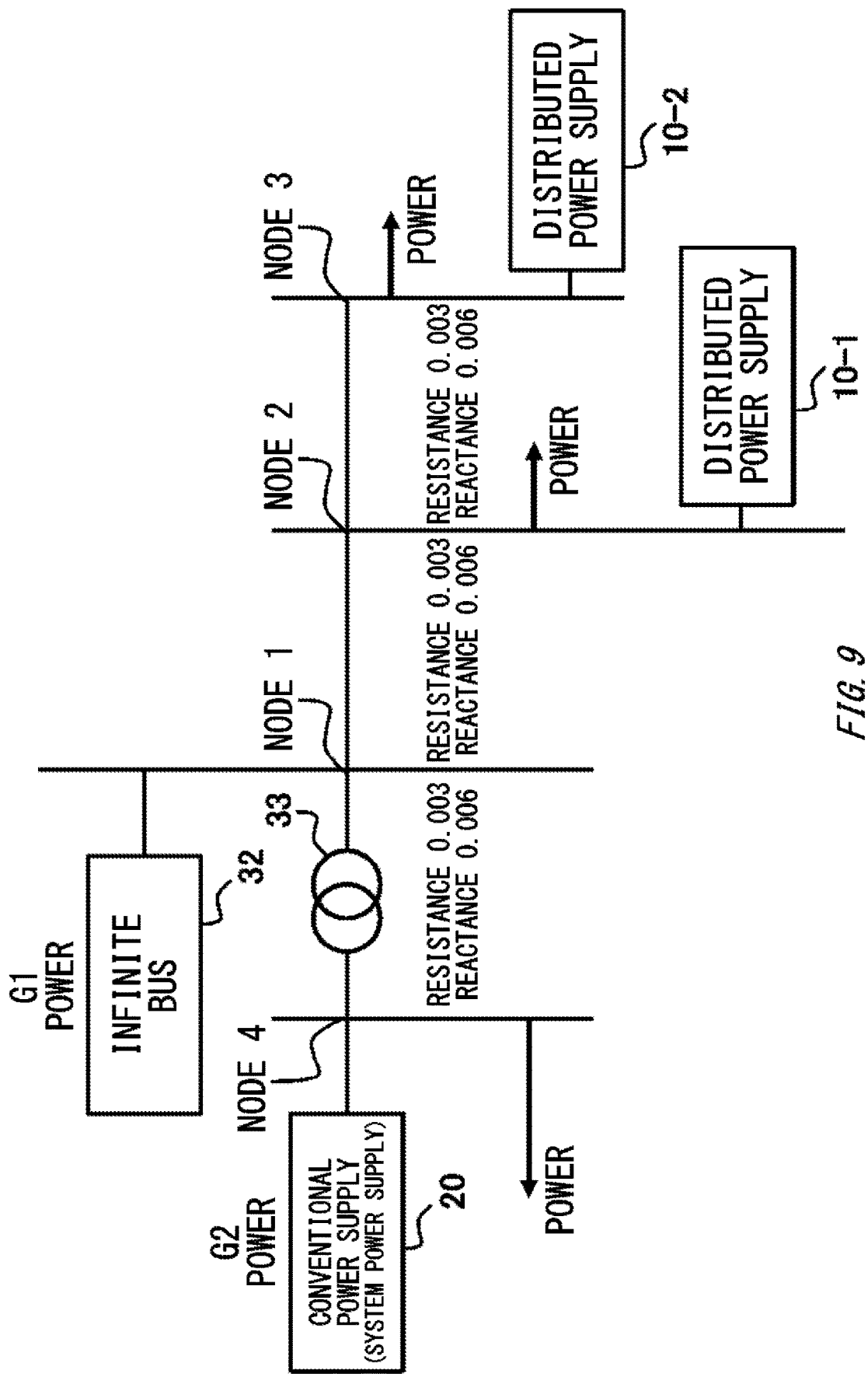
FIG. 9 shows a system configuration of an illustrative example indicating the effect of the present invention.

The effect achieved when a power distribution is performed by the power distribution apparatus 100 configured as described above will be described. FIG. 9 shows a system configuration of an illustrative example indicating the effect of the present invention. As shown in FIG. 9, at the node 4, the conventional power supply 20 is connected to the node 1 via the transformer 33. The infinite bus 32 is connected to the node 1. The node 1 is connected to the node 2 by wiring, and the node 2 is connected to the node 3. The distributed power supply 10-1 is connected to the node 2. The distributed power supply 10-2 is connected to the node 3. In the node 4 to which the conventional power supply 20 is connected, the electrical power is set to 0.4+0.2j. Here, a real part is active power and an imaginary part means reactive power. In the node 2 to which the distributed power supply 10-1 is connected, the electrical power is 0.4+0.2j. In the node 3 to which the distributed power supply 10-1 is connected, the electrical power is 0.4+0.2j. Between the node 4 and the node 1, between the node 1 and the node 2, and between the node 2 and the node 3, the electrical resistance is set to 0.003, and the reactance is set to 0.006.

Figure 10:
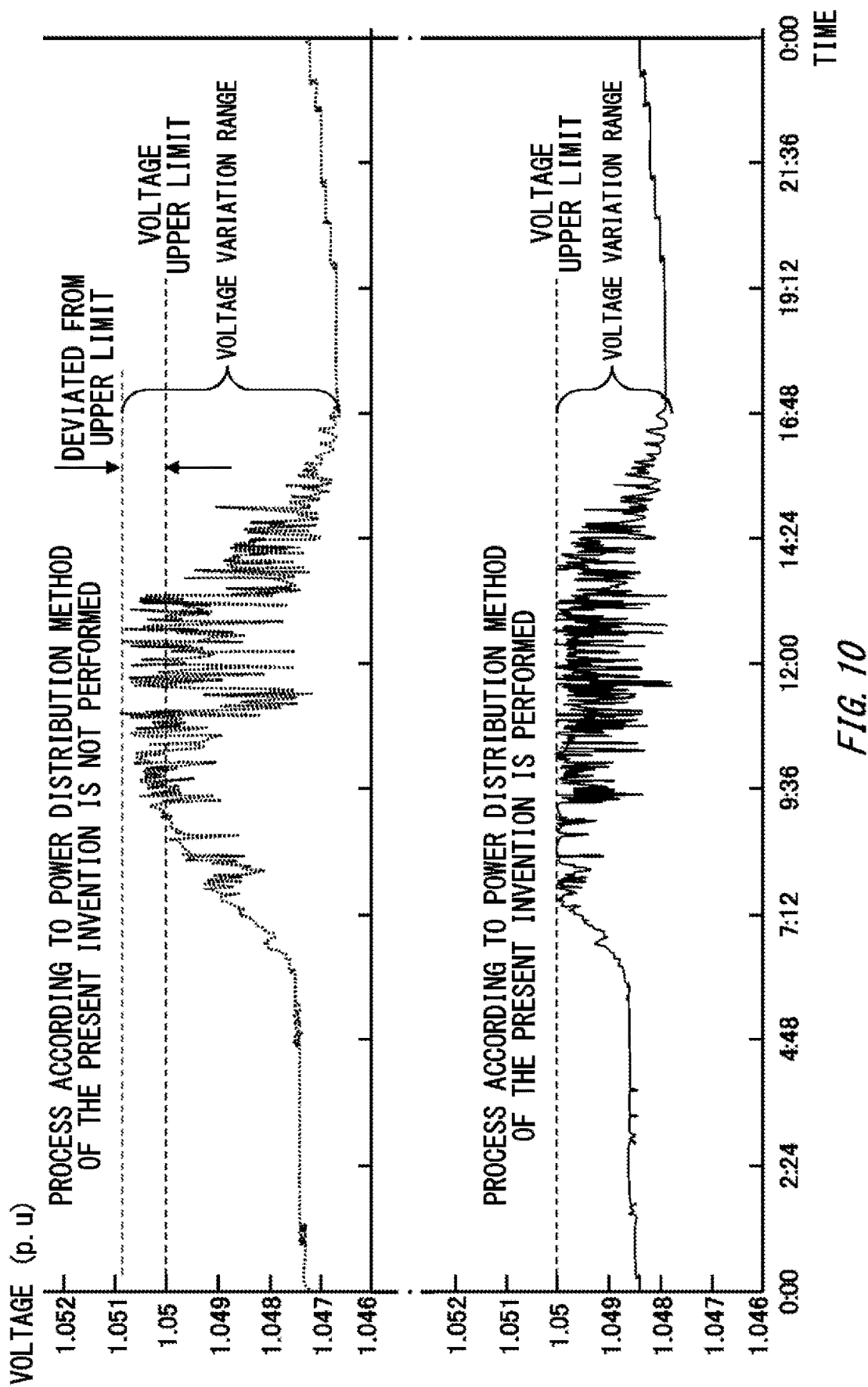
FIG. 10 shows one example of the effect of the present invention.

FIG. 10 shows one example of the effect of the present invention. FIG. 10 indicates voltage for each time in the electric power system 2 indicated in FIG. 9. In FIG. 10, actual data is used for a daily load variation and solar output variation. The horizontal axis in FIG. 10 indicates the time, and the vertical axis in FIG. 10 indicates voltage (pu unit system) in the node 1 of the electric power system 2. To be specific, FIG. 10 indicates a daily voltage change.

The upper part of FIG. 10 indicates a case where the operation of distributed power supply group based on the allocation of active power and reactive power output according to the present invention is not performed.
The lower part of FIG. 10 indicates a case with performing the operation of distributed power supply group based on the allocation of active power and reactive power output according to the present invention.

By performing the operation of the distributed power supply group based on the allocation of active power and reactive power output according to the invention, the frequency of voltage deviation from the voltage upper limit can be reduced compared to the case where the process according to the power distribution method of the present invention is not performed. According to the process according to the power distribution method of the present invention, the voltage satisfies the condition within the voltage upper limit.

In addition, by performing the operation of the distributed power supply group based on the allocation of active power and reactive power output according to the invention, the voltage variation range, which is a difference between a minimal value and a maximum value of the voltage, can be reduced. In the example shown in FIG. 10, compared to the case where the process of the present invention is not performed, the case with performing the process of the present invention can make the voltage variation range to ½ or less and further can perform the operation with a higher voltage. This means, in the case of performing the process of the present invention, the operation has less power transmission loss compared to the case where the process is not performed.

As described above, according to the present invention, appropriate voltage maintenance in the electric power system 2 to which the distributed power supply 10 is introduced can be realized, power transmission loss in the electric power system 2 can be reduced, and output suppression opportunity in the distributed power supply 10 can be reduced. In particular, according to the present invention, by jointly using the optimum flow calculation based on the output distribution estimation of the distributed power supply 10 and the robust optimization, even in the case where the uncertain output of the distributed power supply 10 has been varied, upon explicitly considering all of the constraint condition, an allocation of active power and reactive power of the distributed power supply 10 in which the power transmission loss is reduced can be realized.

Figure 11:
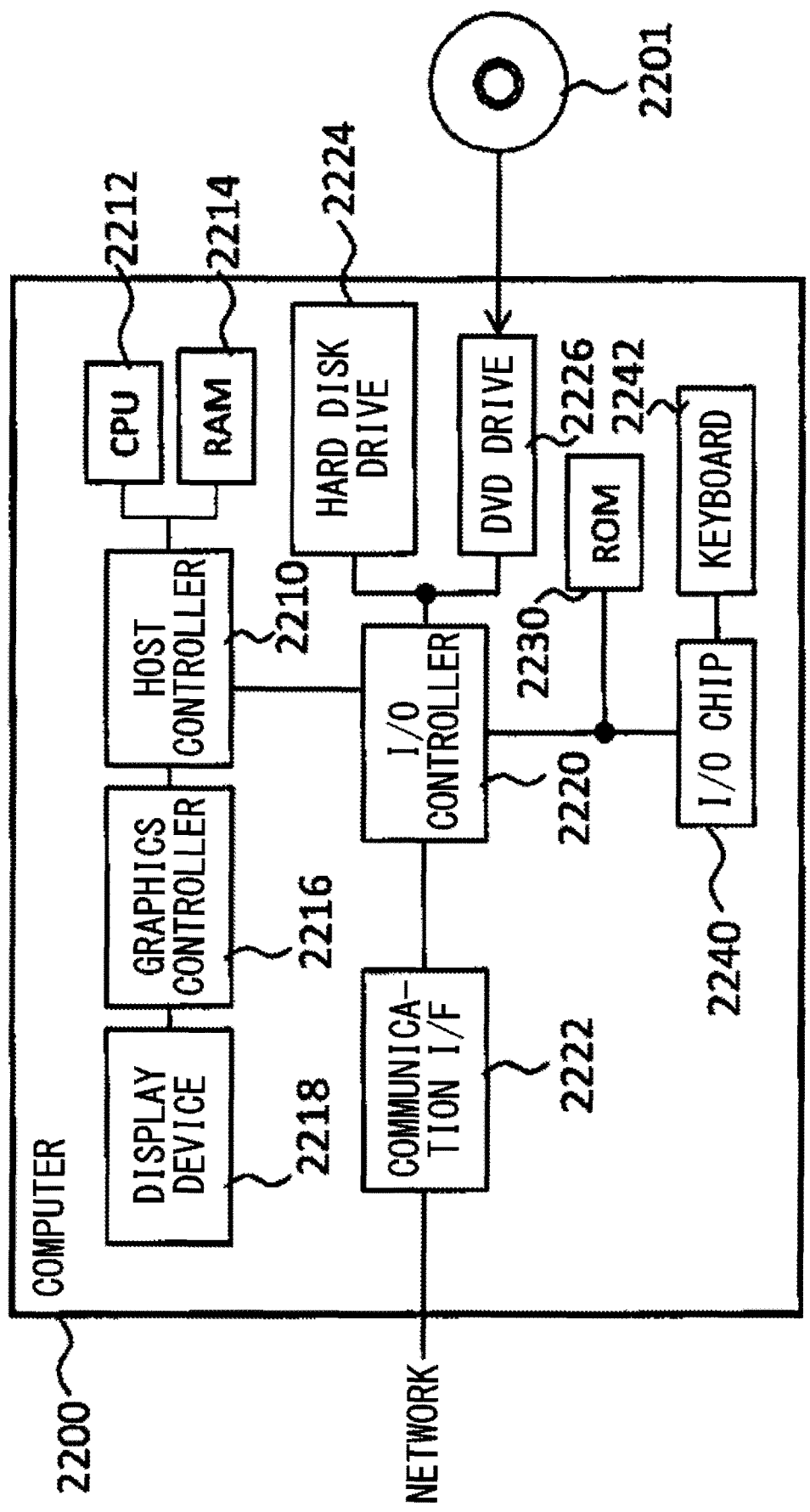
FIG. 11 shows an example of a computer 2200 where a plurality of aspects of the present invention may be entirely or partially embodied.

FIG. 11 shows an example of a computer 2200 in which a plurality of aspects of the present invention may be embodied entirely or partially. A program installed in the computer 2200 can cause the computer 2200 to function as an operation associated with the apparatus according to the embodiment of the present invention or as one or plurality of section of the apparatus, or the program can cause the computer 2200 to perform the operation or the one or plurality of section, and/or the program can cause the computer 2200 to perform the method according to the embodiment of the present invention or the method step. Such a program may be executed by the CPU 2212 to cause the computer 2200 to perform certain operations associated with some or all of the blocks of flowcharts and block diagrams described herein.

The computer 2200 according to the present embodiment includes a CPU 2212, a RAM 2214, a graphics controller 2216, and a display device 2218, which are interconnected by a host controller 2210. The computer 2200 also includes input/output units such as a communication interface 2222, a hard disk drive 2224, a DVD-ROM drive 2226, and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from a DVD-ROM 2201, and provides the hard disk drive 2224 with the programs or the data via the RAM 2214. The IC card drive reads the program and data from an IC card, and/or writes the program and data to the IC card.

The ROM 2230 stores, in itself, a boot program or the like that is executed by the computer 2200 during activation, and/or a program that depends on hardware of the computer 2200. The input/output chip 2240 may also connect various input/output units to the input/output controller 2220 via a parallel port, a serial port, a keyboard port, a mouse port, or the like.

A program is provided by computer-readable medium such as the DVD-ROM 2201 or the IC card. The program is read from the computer-readable medium, installed in the hard disk drive 2224, the RAM 2214, or the ROM 2230, which is also an example of the computer-readable medium, and executed by the CPU 2212. The information processing written in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause the RAM 2214 to read files stored in external recording medium such as a hard disk drive 2224, a DVD-ROM drive 2226 (DVD-ROM 2201), an IC card or the like, or all or necessary parts of the database indicated in FIG. 3 to FIG. 5, to perform a various types of process on the data on the RAM 2214. The CPU 2212 then writes back the processed data to the external recording medium.

Various types of information, such as various types of program, data and table as well as the database indicated in FIG. 3 to FIG. 5 may be stored on the recording medium, to undergo information processing. The CPU 2212 may execute various types of processing on the data read from the RAM 2214 to write back a result to the RAM 2214, the processing being described throughout the present disclosure, specified by instruction sequences of the programs, and including various types of operations, information processing, condition determinations, conditional branch, unconditional branch, information retrievals/replacements, or the like. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is specified, from among the plurality of entries, and read the attribute value of the second attribute stored in the entry, thereby obtaining the attribute value of the second attribute associated with the first attribute satisfying the predetermined condition.

The above-described program or software modules may be stored in the computer-readable medium on the computer 2200 or near the computer 2200. In addition, a recording medium such as a hard disk or a RAM provided in a server system connected to a dedicated communication network or the Internet can be used as the computer-readable medium, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

2 electric power system
4 electrical transmission line
10 distributed power supply
11 inverter
20 conventional power supply
30 load
32 infinite bus
33 transformer
100 power distribution apparatus
110 power measurement value acquisition unit
120 operation history database
130 output estimation unit
140 information acquisition unit
150 calculating unit
160 command unit
201 PV curve
202 PV curve
203 PV curve
204 PV curve
205 PV curve
206 PV curve
2200 computer
2201 DVD-ROM
2210 host controller
2212 CPU
2214 RAM
2216 graphics controller
2218 display device
2220 input/output controller
2222 communication interface
2224 hard disk drive
2226 DVD-ROM drive
2230 ROM
2240 input/output chip
2242 keyboards

What is claimed is:

1. A power distribution apparatus comprising at least one processor, wherein:
the at least one processor calculates, for a plurality of distributed power supplies connected to an electric power system, active power and reactive power to be outputted from each of the plurality of distributed power supplies;
the at least one processor estimates, based on a past operation history of each of the plurality of distributed power supplies, an output range of electrical power that can be outputted from each of the plurality of distributed power supplies in the future;
the at least one processor calculates, based on the output range, the active power and the reactive power of each of the plurality of distributed power supplies, which can satisfy a predetermined objective condition and predetermined constraint condition,
wherein the predetermined objective condition includes a condition where a sum of a power transmission loss in the electric power system and an output suppression amount for electrical power of each of the plurality of distributed power supplies is minimized,
wherein the predetermined constraint condition includes at least one of a condition where a voltage at a connection point between respective inverters and the electric power system is equal to or more than a predetermined lower limit value and equal to or less than a predetermined upper limit value and electrical power to be outputted from each of the plurality of distributed power supplies in the future as an uncertain parameter that varies within the output range, and wherein the power distribution apparatus realizes power distribution that minimizes power transmission loss and output suppression amount.

2. The power distribution apparatus according to claim 1, wherein the at least one processor calculates, based on at least two output states within the output range, the active power and the reactive power of each of the plurality of distributed power supplies, which can satisfy the predetermined objective condition and the predetermined constraint condition.

3. The power distribution apparatus according to claim 1, wherein each of the plurality of distributed power supplies is connected to the electric power system via the respective inverters.

4. The power distribution apparatus according to claim 2, wherein each of the plurality of distributed power supplies is connected to the electric power system via the respective inverters.

5. The power distribution apparatus according to claim 1, wherein the at least one processor calculates the active power and the reactive power of each of the plurality of distributed power supplies by solving a power flow equation such that the active power and the reactive power resulting from the calculation satisfy the predetermined constraint condition including the uncertain parameter.

6. The power distribution apparatus according to claim 2, wherein the at least one processor calculates the active power and the reactive power of each of the plurality of distributed power supplies by solving a power flow equation such that the active power and the reactive power resulting from the calculation satisfy the predetermined constraint condition including the uncertain parameter.

7. The power distribution apparatus according to claim 5, wherein the at least one processor selects a plurality of provisional values of the uncertain parameter within the output range, and calculates a solution of the active power and a solution of the reactive power of each the plurality of distributed power supplies which, even in the case where the uncertain parameter is set to any of the plurality of provisional values, can satisfy the predetermined constraint condition, and which minimize a maximum value of an objective function provided as the objective condition, wherein the maximum value is a value at which the value of the objective function is maximized according to a selected provisional value selected from the plurality of provisional values.

8. The power distribution apparatus according to claim 1, wherein the at least one processor estimates the output range based on a standard deviation of an output change amount of each of the plurality of distributed power supplies in a predetermined period.

9. The power distribution apparatus according to claim 2, wherein the at least one processor estimates the output range based on a standard deviation of an output change amount of each of the plurality of distributed power supplies in a predetermined period.

10. The power distribution apparatus according to claim 1, wherein the past operation history of each of the plurality of distributed power supplies includes an actual value of output power of each of the plurality of distributed power supplies and information indicating whether the output of any of the plurality of distributed power supplies has been suppressed, and in a period where the output of any of the plurality of distributed power supplies has been suppressed, the at least one processor estimates the output range using an estimated actual value calculated from a predetermined relational equation instead of the actual value of the output power.

11. The power distribution apparatus according to claim 2, wherein the past operation history of each of the plurality of distributed power supplies includes an actual value of output power of each of the plurality of distributed power supplies and information indicating whether the output of any of the plurality of distributed power supplies has been suppressed, and in a period where the output of any of the plurality of distributed power supplies has been suppressed, the at least one processor estimates the output range using an estimated actual value calculated from a predetermined relational equation instead of the actual value of the output power.

12. A non-transitory computer-readable medium having a program recorded thereon, wherein the program causes, when being executed by a computer, the computer to function as the power distribution apparatus according to claim 1.

13. A power distribution method to calculate, by using a computer comprising at least one processor, for a plurality of distributed power supplies connected to an electric power system, active power and reactive power to be outputted from each of the plurality of distributed power supplies, the power distribution method comprising:

estimating using the at least one processor, based on a past operation history of each of the plurality of distributed power supplies, an output range of electrical power that can be outputted from each of the plurality of distributed power supplies in the future; and calculating using the at least one processor, based on the output range, the active power and the reactive power of each of the plurality of distributed power supplies which can satisfy a predetermined objective condition and predetermined constraint condition, wherein the predetermined objective condition includes a condition where a sum of a power transmission loss in the electric power system and an output suppression amount for electrical power of each of the plurality of distributed power supplies is minimized, wherein the predetermined constraint condition includes at least one of a condition where a voltage at a connection point between respective inverters and the electric power system is equal to or more than a predetermined lower limit value and equal to or less than a predetermined upper limit value and electrical power to be outputted from each of the plurality of distributed power supplies in the future as an uncertain parameter that varies within the output range, and wherein the power distribution method realizes power distribution that minimizes power transmission loss and output suppression amount.

\* \* \* \* \*